US012355181B2

(12) United States Patent
Ikeya et al.

(10) Patent No.: US 12,355,181 B2
(45) Date of Patent: Jul. 8, 2025

(54) FITTING DEVICE

(71) Applicant: SUMITOMO WIRING SYSTEMS, LTD., Mie (JP)

(72) Inventors: Kohei Ikeya, Mie (JP); Takuya Uemura, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 330 days.

(21) Appl. No.: 18/021,495

(22) PCT Filed: Jul. 27, 2021

(86) PCT No.: PCT/JP2021/027728
§ 371 (c)(1),
(2) Date: Feb. 15, 2023

(87) PCT Pub. No.: WO2022/044657
PCT Pub. Date: Mar. 3, 2022

(65) Prior Publication Data
US 2024/0022018 A1 Jan. 18, 2024

(30) Foreign Application Priority Data
Aug. 28, 2020 (JP) ................................ 2020-144408

(51) Int. Cl.
*H01R 13/52* (2006.01)

(52) U.S. Cl.
CPC ..... *H01R 13/5221* (2013.01); *H01R 13/5202* (2013.01); *H01R 13/521* (2013.01); *H01R 2201/26* (2013.01)

(58) Field of Classification Search
None
See application file for complete search history.

(56) References Cited

U.S. PATENT DOCUMENTS 4,810,208 A * 3/1989 Hayes ................ H01R 13/5208 439/589
4,973,268 A * 11/1990 Smith .................. H01R 13/443 439/948

(Continued)

FOREIGN PATENT DOCUMENTS

CN 107732554 A * 2/2018 ............. H01R 13/46
JP 2009-259693 A 11/2009

(Continued)

OTHER PUBLICATIONS

International Search Report issued on Oct. 12, 2021 for WO 2022/044657 A1 (4 pages).

*Primary Examiner* — Tho D Ta
(74) *Attorney, Agent, or Firm* — Venjuris, P.C.

(57) ABSTRACT

A fitting device includes a connection terminal, a tubular housing that covers an outer circumference of the connection terminal, a rubber ring attached to an outer circumferential surface of the housing, and a retainer that prevents the rubber ring from being dislodged. The retainer includes a tubular main body portion, and a plurality of arm portions extending from the main body portion in a front-rear direction. Each arm portion includes an extension portion extending from the main body portion toward the rubber ring in the front-rear direction, a first projection protruding from the extension portion toward an inner circumferential surface, and a second projection protruding from the extension portion toward the outer circumferential surface of the housing. An amount of insertion of the second projection into the recess is larger than a gap between a protruding end of the first projection and the inner circumferential surface.

8 Claims, 6 Drawing Sheets

(56) References Cited

U.S. PATENT DOCUMENTS

| | | | | | |
|---|---|---|---|---|---|
| 5,551,892 | A * | 9/1996 | Endo | H01R 43/22 439/589 |
| 5,913,697 | A * | 6/1999 | Myer | H01R 13/4365 439/595 |
| 6,004,153 | A * | 12/1999 | Myer | H01R 13/641 439/352 |
| 6,786,768 | B2 * | 9/2004 | Murakami | H01R 13/4365 439/271 |
| 8,187,042 | B2 * | 5/2012 | Kimura | H01R 13/4365 439/271 |
| 2002/0076996 | A1 * | 6/2002 | Murakami | H01R 13/4365 439/752.5 |
| 2002/0106937 | A1 | 8/2002 | Ichio et al. | |
| 2002/0123257 | A1 | 9/2002 | Matsuoka | |
| 2002/0123260 | A1 | 9/2002 | Ichio | |
| 2002/0127913 | A1 | 9/2002 | Ichio | |

FOREIGN PATENT DOCUMENTS

| | | | | |
|---|---|---|---|---|
| JP | 2015-133275 | A | 7/2015 | |
| WO | WO-2019065387 | A1 * | 4/2019 | H01R 13/193 |

* cited by examiner

FITTING DEVICE

CROSS REFERENCE TO RELATED APPLICATIONS

This application is a national phase of PCT application No. PCT/JP2021/027728, filed on Jul. 27, 2021, which claims priority from Japanese patent application No. 2020-144408, filed on Aug. 28, 2020, all of which are incorporated herein by reference.

TECHNICAL FIELD

The present disclosure relates to a fitting device.

BACKGROUND

Patent Document 1 discloses a connector configured to be fitted to a female connector. The connector disclosed in Patent Document 1 includes a housing to which a terminal fitting is inserted, a rubber ring that waterproofs the space between the connector and the female connector, and a retainer that supports the terminal fitting and prevents the rubber ring from being dislodged. Note that the retainer is referred to as a holding member in Patent Document 1.

The housing includes a terminal accommodating portion into which the terminal fitting is inserted, and a tubular hood portion surrounding the terminal accommodating portion. The hood portion is coupled to the terminal accommodating portion via a coupling portion that bulges radially from an outer circumferential surface of the terminal accommodating portion. The female connector is fitted between the hood portion and the terminal accommodating portion. The rubber ring is attached to the outer circumferential surface of the terminal accommodating portion.

The retainer is mounted to the terminal accommodating portion from the front, or in other words, from the distal end side of the housing. The retainer includes a tubular holding plate that covers the outer circumferential surface of the terminal accommodating portion. A holding protrusion that is to be engaged with a holding groove portion provided in the outer circumferential surface of the terminal accommodating portion is provided on an inner circumferential surface of the holding plate. As a result of the holding protrusion being engaged with the holding groove portion, the retainer is mounted to the terminal accommodating portion. The holding plate faces an front end face of the rubber ring. Thus, the rubber ring is prevented from being dislodged from the housing.

PRIOR ART DOCUMENT

Patent Document

Patent Document 1: JP 3968638 B

SUMMARY OF THE INVENTION

Problem to be Solved

Meanwhile, when a load is applied to the retainer during insertion or removal of the connector into or from the female connector, the holding protrusion of the retainer may be disengaged from the holding groove portion, thus causing the retainer to be detached from the housing.

An object of the present disclosure is to provide a fitting device capable of suppressing detachment of a retainer.

Means to Solve the Problem

A fitting device according to the present disclosure is a fitting device configured to be fitted to an opening provided in a case for accommodating an in-vehicle device, the fitting device including: a conductive path that is to be connected to the in-vehicle device; a tube including an insertion portion that is inserted into the opening, and that covers an outer circumference of the conductive path; a sealing member that is attached to an outer circumferential surface of the insertion portion, and that waterproofs a space between the tube and the case; and a retainer that is attached to the insertion portion, and that prevents the sealing member from being dislodged from the tube, wherein the tube has a recess provided in the outer circumferential surface of the insertion portion, the retainer includes a tubular main body portion that covers the outer circumferential surface of the insertion portion, and an arm portion extending from the main body portion and configured to be elastically deformable, the arm portion includes an extension portion extending from the main body portion toward the sealing member in an axial direction of the main body portion, a first projection protruding from the extension portion toward an inner circumferential surface defining the opening, and a second projection protruding from the extension portion toward an outer circumferential surface of the tube and configured to be engaged with the recess, and an amount of insertion of the second projection into the recess is larger than a gap between the first projection and the inner circumferential surface defining the opening.

Effect of the Invention

According to the present disclosure, it is possible to suppress detachment of a retainer.

DETAILED DESCRIPTION TO EXECUTE THE INVENTION

Description of Embodiments of Present Disclosure

Figure 1:
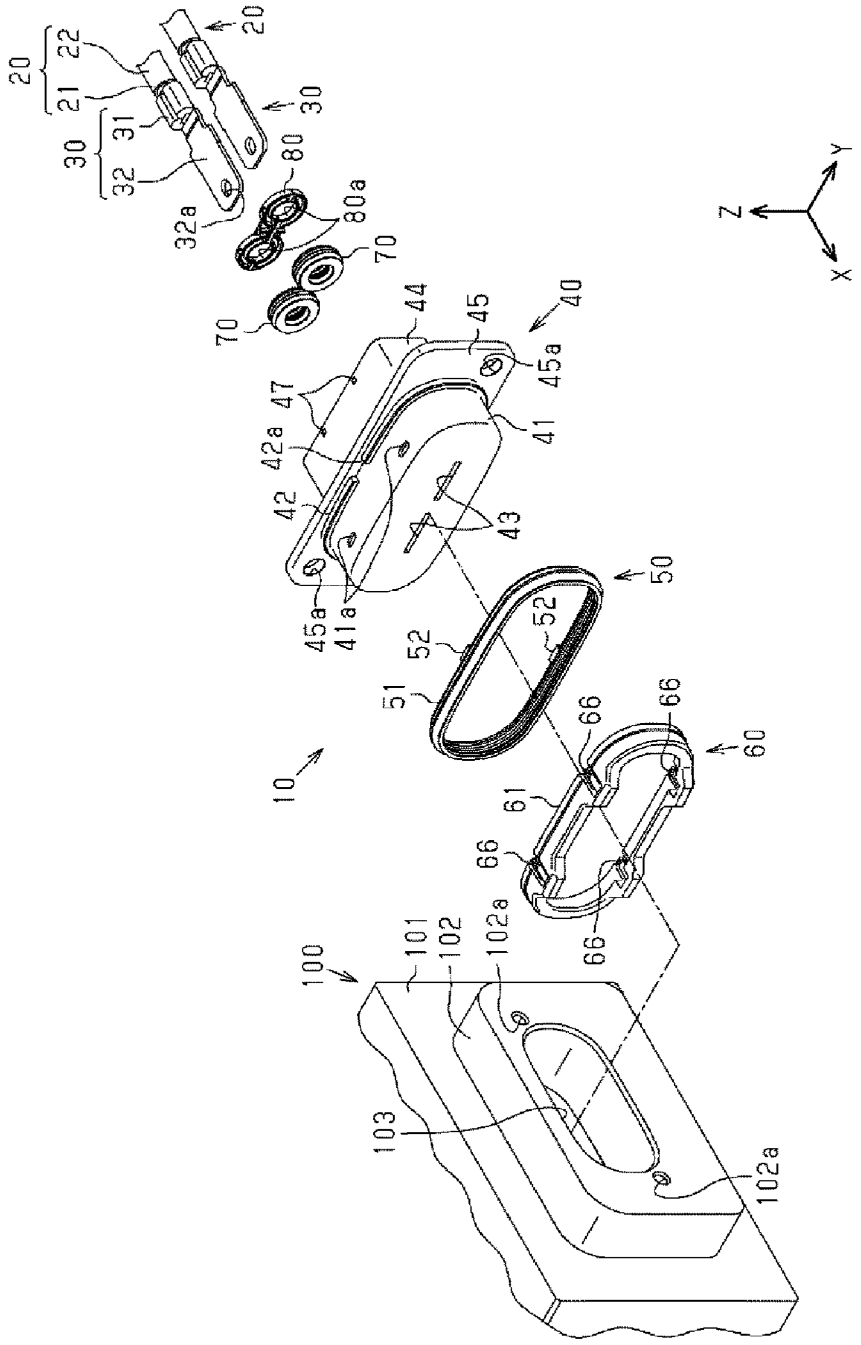
FIG. 1 is an exploded perspective view showing a fitting device and a case according to an embodiment.

First, aspects of the present disclosure will be listed and described.

[1] A fitting device according to the present disclosure is a fitting device configured to be fitted to an opening provided in a case for accommodating an in-vehicle device, the fitting device including: a conductive path that is to be connected to the in-vehicle device; a tube including an insertion portion that is inserted into the opening, and that covers an outer circumference of the conductive path; a sealing member that is attached to an outer circumferential surface of the insertion portion, and that waterproofs a space between the tube and the case; and a retainer that is attached to the insertion portion, and that prevents the sealing member from being dislodged from the tube, wherein the tube has a recess provided in the outer circumferential surface of the insertion portion, the retainer includes a tubular main body portion that covers the outer circumferential surface of the insertion portion, and an arm portion extending from the main body portion and configured to be elastically deformable, the arm portion includes an extension portion extending from the main body portion toward the sealing member in an axial direction of the main body portion, a first projection protruding from the extension portion toward an inner circumferential surface defining the opening, and a second projection protruding from the extension portion toward an outer circumferential surface of the tube and configured to be engaged with the recess, and an amount of insertion of the second projection into the recess is larger than a gap between the first projection and the inner circumferential surface defining the opening.

With this configuration, the retainer is attached to the tube as a result of the second projection of the arm portion being engaged with the recess of the insertion portion. In addition, the amount of insertion of the second projection into the recess is larger than the gap between the first projection and the inner circumferential surface defining the opening. Accordingly, even if the second projection is displaced in a direction away from the recess as a result of the arm portion being elastically deformed, the engagement between the second projection and the recess can be maintained by the first projection coming into contact with the inner circumferential surface defining the opening. Accordingly, for example, even if a load is applied to the arm portion during insertion or removal of the fitting device into or from the case, it is possible to suppress the engagement between the second projection and the recess from being released. Accordingly, it is possible to suppress detachment of the tube from the retainer.

[2] It is preferable that a thickness of the extension portion is smaller than a thickness of the main body portion.

With this configuration, the extension portion can be easily elastically deformed with respect to the main body portion. This facilitates attachment and removal of the retainer to and from the housing.

As a result of the extension portion being easily elastically deformed with respect to the main body portion, the engagement between the second projection and the recess is likely to be released. However, the engagement between the second projection and the recess is maintained by the first projection coming into contact with the inner circumferential surface defining the opening. Accordingly, it is possible to suppress detachment of the retainer from the tube.

[3] It is preferable that the main body portion has a notch extending in the axial direction, and cut out from an end portion of the main body portion that faces the sealing member in the axial direction, and a proximal end of the extension portion is located inside the notch.

With such a configuration, the proximal end of the extension portion is located inside the notch extending in the axial direction. Accordingly, it is possible to suppress an increase in the size of the retainer, and hence the size of the fitting device, as compared with a configuration that does not include the notch.

[4] It is preferable that the main body portion includes a protruding portion protruding toward a side opposite to the sealing member in the axial direction, the notch extends to the protruding portion, and the proximal end of the extension portion is located at a portion of the notch that extends to the protruding portion.

With this configuration, the proximal end of the extension portion is located at a portion of the notch that extends to the protruding portion. This makes it possible to set the proximal end of the extension portion at a position away from the sealing member. Accordingly, it is possible to prevent an excessive load from acting on the arm portion when the arm portion is elastically deformed.

[5] It is preferable that a protruding end of the protruding portion is provided with an inclined surface that is inclined so as to be away from the inner circumferential surface defining the opening toward the side opposite to the sealing member in the axial direction.

With this configuration, the fitting device can be easily guided to the inside of the opening by the inclined surface of the protruding portion when the fitting device is inserted into the opening of the case. Accordingly, an operation of fitting the fitting device to the case can be easily performed.

[6] It is preferable that the main body portion includes a restricting projection that protrudes from an end portion thereof facing the sealing member in the axial direction toward the inner circumferential surface defining the opening, and that restricts movement of the sealing member in the axial direction, and the restricting projection is provided at a position closer to the sealing member than a distal end of the arm portion in the axial direction.

With this configuration, movement of the sealing member in the axial direction is restricted by the restricting projection. Accordingly, it is possible to suppress the sealing member from riding on the retainer and being detached from the tube.

[7] It is preferable that a protruding end of the first projection is provided at a position arranged side by side with the restricting projection in a circumferential direction of the main body portion, and the restricting projection protrudes to a position closer to the inner circumferential surface defining the opening than the protruding end of the first projection.

With this configuration, when the retainer comes into contact with the inner circumferential surface defining opening by inserting the case of the fitting device into the opening, the restricting projection comes into contact with the aforementioned inner circumferential surface, preferentially over the first projection. Accordingly, it is possible to prevent an excessive load from acting on the arm portion as a result of the first projection coming into contact with the inner circumferential surface defining the opening.

[8] It is preferable that the main body portion includes: a general portion constituting a tubular portion that covers an outer circumferential surface of the insertion portion; and a restricting projection that protrudes from an end portion of the general portion that faces the sealing member in the axial direction toward the inner circumferential surface defining the opening, and that restricts movement of the sealing member in the axial direction, and a protruding end of the first projection is provided at a position arranged side by side with the general portion in the circumferential direction of the main body portion, and the general portion protrudes to a position closer to the inner circumferential surface defining the opening than the protruding end of the first projection.

With this configuration, when the retainer comes into contact with the inner circumferential surface defining the opening by inserting the fitting device into the opening of the case, the general portion comes into contact with the aforementioned inner circumferential surface, preferentially over the first projection. Accordingly, it is possible to prevent an excessive load from acting on the arm portion as a result of the first projection coming into contact with the inner circumferential surface defining the opening.

Details of Embodiments of the Present Disclosure

Specific examples of the fitting device according to the present disclosure will be described below with reference to the drawings. In the drawings, portions of configurations are shown exaggerated or simplified in some cases for convenience of description. Also, dimensional proportions of the portions may be different from the actual dimensional proportions in the drawings. It should be noted that the present disclosure is not limited to these examples, but is defined by the claims, and is intended to include all modifications which fall within the scope of the claims and the meaning and scope of equivalents thereof. The term "parallel" or "orthogonal" as used herein includes not only being exactly parallel or orthogonal, but also being substantially parallel or orthogonal, as long as the operations and effects of the present embodiment can be achieved.

Figure 2:
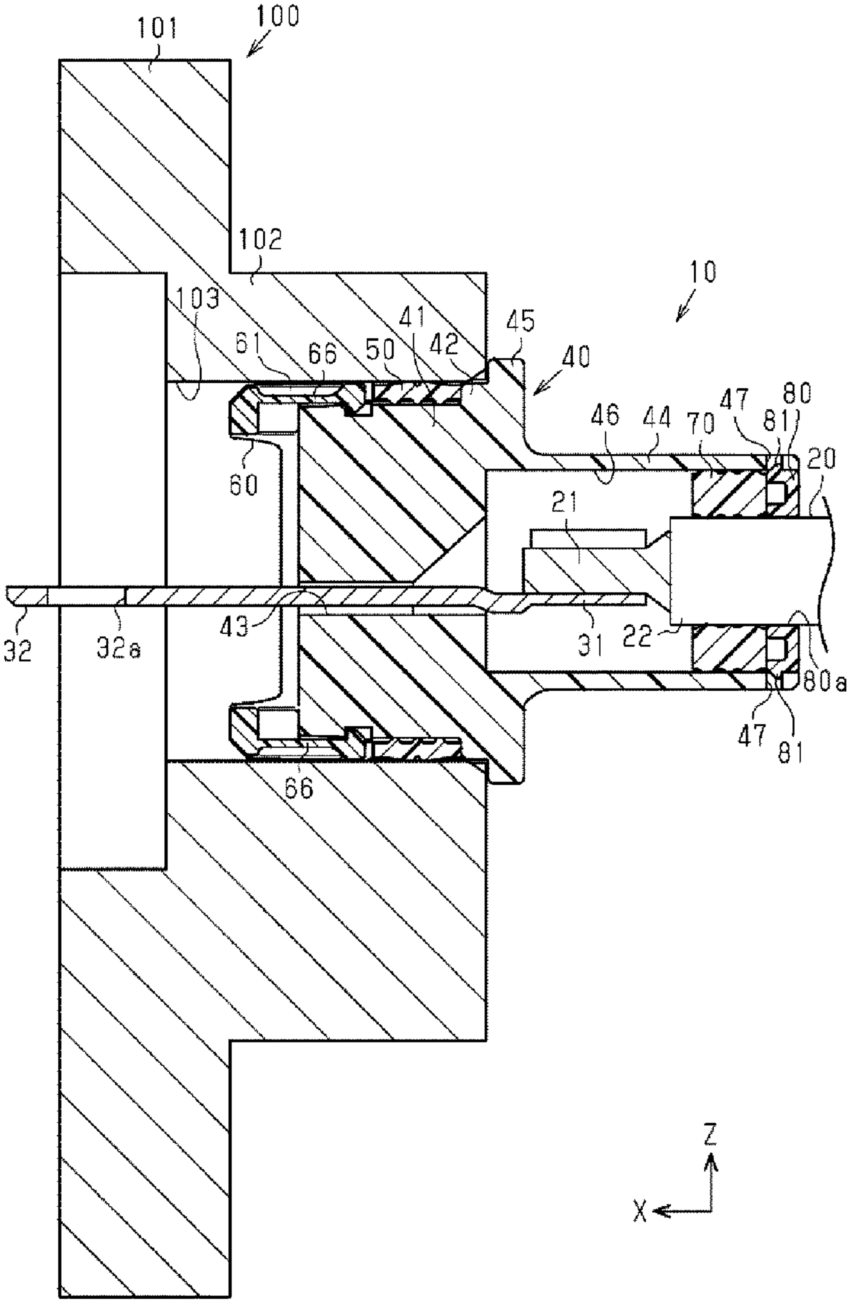
FIG. 2 is a cross-sectional view showing the fitting device fitted to the case according to the embodiment.

As shown in FIGS. 1 and 2, a fitting device 10 according to the present embodiment is configured to be fitted to an opening 103 provided in a case 100 for accommodating an in-vehicle device. The fitting device 10 is to be electrically connected, for example, to a counterpart terminal (not shown) provided inside the case 100.

Configuration of Case 100

The case 100 includes a box-shaped main body portion 101, and a mounting portion 102 that protrudes from the main body portion 101 and to which the fitting device 10 is to be mounted.

For example, a metal material such as an aluminum alloy can be used as the material of the case 100.

The mounting portion 102 has an opening 103 to which the fitting device 10 is to be fitted. The opening 103 extends through the mounting portion 102 in a protruding direction of the mounting portion 102. The opening 103 is formed in a flat shape as viewed in the aforementioned protruding direction. By having the opening 103, the mounting portion 102 has an annular shape.

The mounting portion 102 is provided with one or more internal threads **102*a* for fixing the fitting device 10 to the case 100 using a bolt or bolts (not shown). In the present embodiment, two internal threads 102*a* are provided opposite to each other with the opening 103** interposed therebetween.

Overall Configuration of Fitting Device 10

The fitting device 10 includes a plurality of connection terminals 30 that are to be electrically connected to the counterpart terminal, a tubular housing 40 that covers outer circumferences of the plurality of connection terminals 30, a rubber ring 50 attached to an outer circumferential surface of the housing 40, and a retainer 60 that prevents the rubber ring 50 from being dislodged. In addition, the fitting device 10 includes rubber stoppers 70 mounted to an end portion of the housing 40, and a back retainer 80 that prevents the rubber stoppers 70 from being dislodged from the housing 40.

Of X, Y, and Z axes in the drawings, the X axis indicates an axial direction of the fitting device 10, the Y axis indicates a width direction of the fitting device 10 that is orthogonal to the X axis, and the Z axis indicates a height direction of the fitting device 10 that is orthogonal to the X-Y plane. For the sake of convenience, in the following description, a direction extending along the X axis is referred to as a front-rear direction X, a direction extending along the Y axis is referred to as a lateral direction Y, and a direction extending along the Z axis is referred to as a vertical direction Z. In addition, in the following description, the X-arrow direction is the forward direction, and the Z-arrow direction is the upward direction in FIG. 1.

Here, the term "flat shape" as used herein includes, for example, a rectangular shape, an oblong shape, and an elliptic shape. The term "oblong shape" as used herein refers to a shape composed of two parallel lines having substantially equal lengths, and two semicircular shapes.

The term "ring" as used herein means a structure having an overall shape of a continuous and seamless loop, or in other words, an endless structure having a start point and an end point that coincide with each other. In addition, the term "ring" as used herein includes circular rings having a circular outer edge, rings having an ellipsoidal or oblong outer edge, polygonal rings having a polygonal outer edge, and rings having a rounded-corner polygonal outer edge, and refers to a shape constituted by any closed shape having an outer edge shape connected with a straight line or a curved line. The term "ring" refers to a shape having a through hole in a plan view, and includes rings in which the outer edge shape and the inner circumferential shape of the through hole are the same, and rings in which the outer edge shape and the inner circumferential shape of the through hole are different. The term "ring" includes rings having a predetermined length extending in an axial direction in which a central axis passing through the center of the through hole extends, and there is no limitation with respect to the size of the length. In addition, the term "annular shape" as used herein may be any shape that can be regarded as a ring as a whole, and includes annular shapes having a notch, a slit or the like in its part, such as a C-shape. The term "tubular" as used herein may be any shape that can be regarded as being tubular as a whole, and includes a tubular shape formed by a combination of a plurality of components, and a tubular shape having a notch, a slit or the like in its part, such as a C-shape.

Configuration of Connection Terminals 30

Each of the connection terminals 30 is electrically connected to an end portion of the corresponding wire 20. The fitting device 10 according to the present embodiment includes two connection terminals 30 that are respectively connected to end portions of the two wires 20.

Each of the wires 20 is a covered wire including a core wire 21 made of a conductor, and an insulation covering 22 that covers an outer circumference of the core wire 21.

Each of the connection terminals 30 includes a wire connection portion 31 that is connected to an end portion of the corresponding wire 20, and a terminal connection portion 32 that is to be connected to a counterpart terminal (not shown). A front end portion of the terminal connection portion 32 protrudes from a front end portion of the housing 40.

For example, a metal material such as copper, a copper alloy, aluminum, an aluminum alloy, or stainless steel can be used as the material of the connection terminal 30. The connection terminal 30 is formed, for example, by pressing a metal plate having excellent conductivity.

Each of the wire connection portions 31 is electrically connected to an end portion of the corresponding core wire 21 that is exposed from the insulation covering 22. The connection terminal 30 is connected to the core wire 21, for example, through crimping, ultrasonic welding, or the like, for example. Note that the wire 20 and the connection terminal 30 are examples of a conductive path.

Each of the terminal connection portions 32 is formed in a flat plate shaped, for example. The terminal connection portion 32 has, in a front end portion thereof, a through hole 32*a* extending therethrough in the plate thickness direction. The terminal connection portion 32 is electrically connected to the counterpart terminal using, for example, a bolt (not shown) inserted into the through hole 32*a*.

Configuration of Housing 40

The housing 40 has a tubular shape that extends in the front-rear direction X. The housing 40 is formed, for example, in a flat shape that is longer in the lateral direction Y than in the vertical direction Z. Note that the housing 40 is an example of a tube.

For example, an insulating material such as a synthetic resin can be used as the material of the housing 40.

The housing 40 includes an insertion portion 41 that is to be inserted into the opening 103, and a placement portion 44 that is to be disposed outside of the case 100. The insertion portion 41 is inserted into the opening 103 from the rear to the front in the front-rear direction X.

Configuration of Insertion Portion 41

The insertion portion 41 is formed protruding forward from a front end portion of the placement portion 44. The insertion portion 41 is formed, for example, in a flat shape that is longer in the lateral direction Y than in the vertical direction Z, as viewed in the front-rear direction X. The insertion portion 41 has an outer circumferential surface having a shape corresponding to the shape of an inner circumferential surface defining the opening 103.

A protruding portion 42 protruding toward the inner circumferential surface defining the opening 103 is provided at a rear end portion of the insertion portion 41. The protruding portion 42 extends in the circumferential direction of the housing 40. Grooves 42*a* are provided in portions of the protruding portion 42 in the circumferential direction. Each of the grooves 42*a* is provided in a central portion of the insertion portion 41 in the lateral direction Y. In the present embodiment, one groove 42*a* is provided on either side of the insertion portion 41 in the vertical direction Z.

A plurality of recesses 41*a* are provided in an outer circumferential surface of the insertion portion 41. Each of the recesses 41*a* is provided in the outer circumferential surface of the insertion portion 41 at a position away from the protruding portion 42 in the front-rear direction X. In the present embodiment, two recesses 41*a* that are located so as to be spaced apart from each other in the lateral direction Y are respectively provided on both sides of the insertion portion 41 in the vertical direction Z. That is, the housing 40 of the present embodiment includes four recesses 41*a*.

The insertion portion 41 has two holding holes 43 that are aligned in the lateral direction Y, for example. Each of the holding holes 43 is formed extending through the insertion portion 41 in the front-rear direction X. The terminal connection portions 32 of the connection terminals 30 are held inside the corresponding holding holes 43. The two connection terminals 30 that are held inside the corresponding holding holes 43 are aligned in the lateral direction Y so as to be spaced apart from each other.

Configuration of Placement Portion 44

The placement portion 44 is formed protruding rearward from a rear end portion of the insertion portion 41. The placement portion 44 is formed, for example, in an annular shape that is longer in the lateral direction Y than in the vertical direction Z, as viewed in the front-rear direction X. The placement portion 44 is formed to have an outer shape smaller than the outer shape of the insertion portion 41, for example.

An annular flange portion 45 protruding circumferentially outward is provided around the entire circumference of a front end portion of the placement portion 44. The flange portion 45 protrudes circumferentially outward relative to the protruding portion 42 of the insertion portion 41. The flange portion 45 is provided with two through holes 45*a* extending therethrough in the front-rear direction X. The two through holes 45*a* are provided at positions respectively corresponding to the two internal threads 102*a* of the case 100.

As shown in FIG. 2, the placement portion 44 has insertion holes 46 into which the wires 20 and the connection terminals 30 are inserted. For example, the placement portion 44 has two insertion holes 46 that are aligned in the lateral direction Y. The insertion holes 46 are formed extending through the placement portion 44 in the front-rear direction X. The insertion holes 46 are in communication with the corresponding holding holes 43 in the front-rear direction X. For example, the wire connection portions 31 of the corresponding connection terminals 30 are located inside the insertion holes 46.

A plurality of engaging holes 47 are provided in a rear end portion of the placement portion 44. Each of the engaging holes 47 is formed extending through the placement portion 44 in the vertical direction Z. In the present embodiment, two engaging holes 47 that are located so as to be spaced apart from each other in the lateral direction Y are respectively provided on both sides of the placement portion 44 in the vertical direction Z. That is, the housing 40 of the present embodiment has four engaging holes 47.

Two rubber stoppers 70 each having an annular shape are accommodated in the rear end portion of the placement portion 44. The wires 20 are inserted into the respective rubber stoppers 70. Each of the rubber stoppers 70 waterproofs the space between the outer circumferential surface of the corresponding wire 20 and an inner circumferential surface defining the insertion hole 46.

A back retainer 80 is accommodated in the rear end portion of the placement portion 44. The back retainer 80 prevents the two rubber stoppers 70 from being dislodged from the housing 40, for example, by coming into contact with rear end faces of the two rubber stoppers 70.

The back retainer 80 has two through holes 80*a* extending therethrough in the front-rear direction X. The wires 20 are inserted into the respective through holes 80*a*.

As shown in FIG. 2, the back retainer 80 includes a plurality of fixing pawls 81 protruding circumferentially outward from an outer circumferential surface of the back retainer 80, for example. The back retainer 80 is fixed to the housing 40 as a result of the fixing pawls 81 engaging with the engaging holes 47. Note that the wires 20 are drawn to the outside from a rear end portion of the housing 40 through the through holes 80*a* of the back retainer 80.

Configuration of Rubber Ring 50

As shown in FIGS. 1 and 2, the rubber ring 50 is attached to the outer circumferential surface of the insertion portion 41. The rubber ring 50 waterproofs the space between the housing 40 and the case 100. Note that the rubber ring 50 is an example of a sealing member.

The rubber ring 50 includes a main body portion 51 having an annular shape, and positioning protrusions 52 protruding rearward from the main body portion 51. The main body portion 51 and the positioning protrusions 52 are provided in one piece. In the present embodiment, one positioning protrusion 52 is provided on either side of the main body portion 51 in the vertical direction Z.

The rubber ring 50 is attached to the outer circumferential surface of the insertion portion 41, with the positioning protrusions 52 fitted into the grooves 42*a*. Thus, the rubber ring 50 is positioned relative to the insertion portion 41 in the circumferential direction.

Configuration of Retainer 60

The retainer 60 is attached to the insertion portion 41. The retainer 60 faces the rubber ring 50 in the front-rear direction X. Accordingly, the retainer 60 prevents the rubber ring 50 from being dislodged from the housing 40 by being attached to the insertion portion 41.

The retainer 60 includes a tubular main body portion 61 that covers the insertion portion 41, and a plurality of arm portions 66 extending from the main body portion 61 in the front-rear direction X and configured to be elastically deformable.

Configuration of Main Body Portion 61

Figure 3:
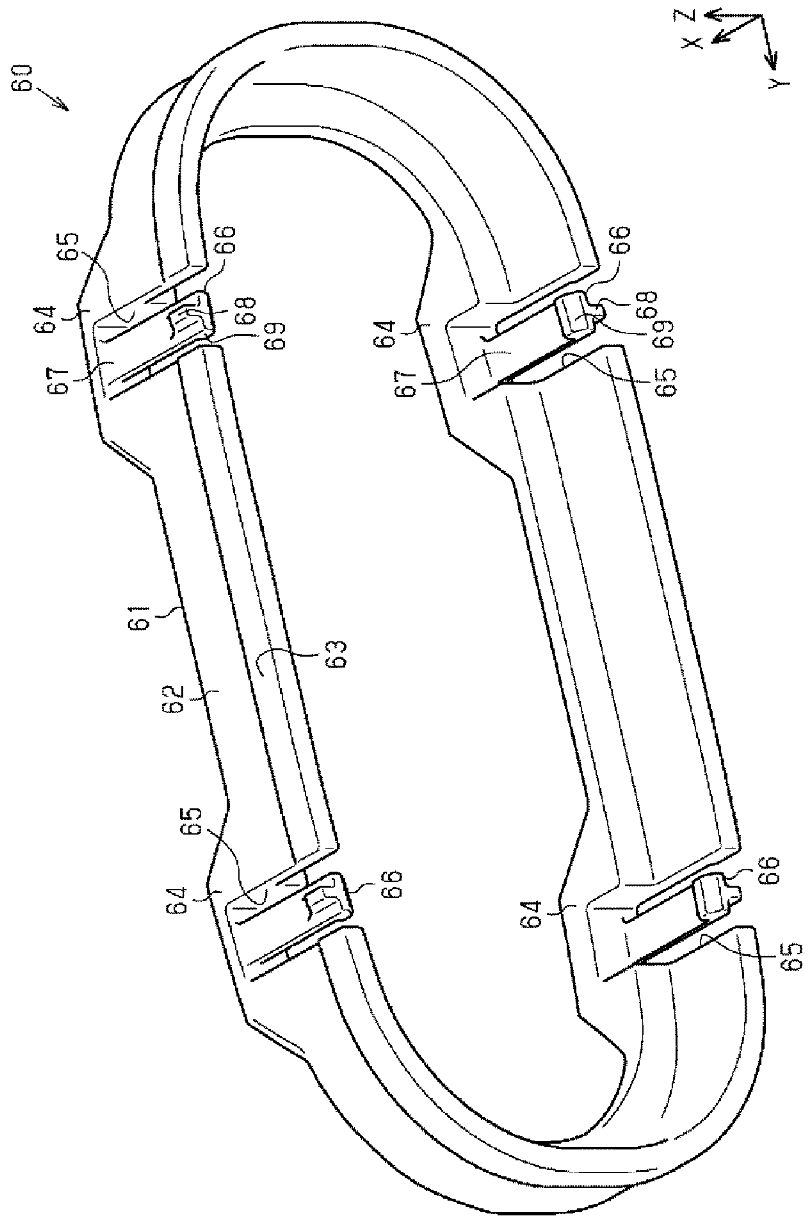
FIG. 3 is a perspective view showing a retainer according to the embodiment.
Figure 4:
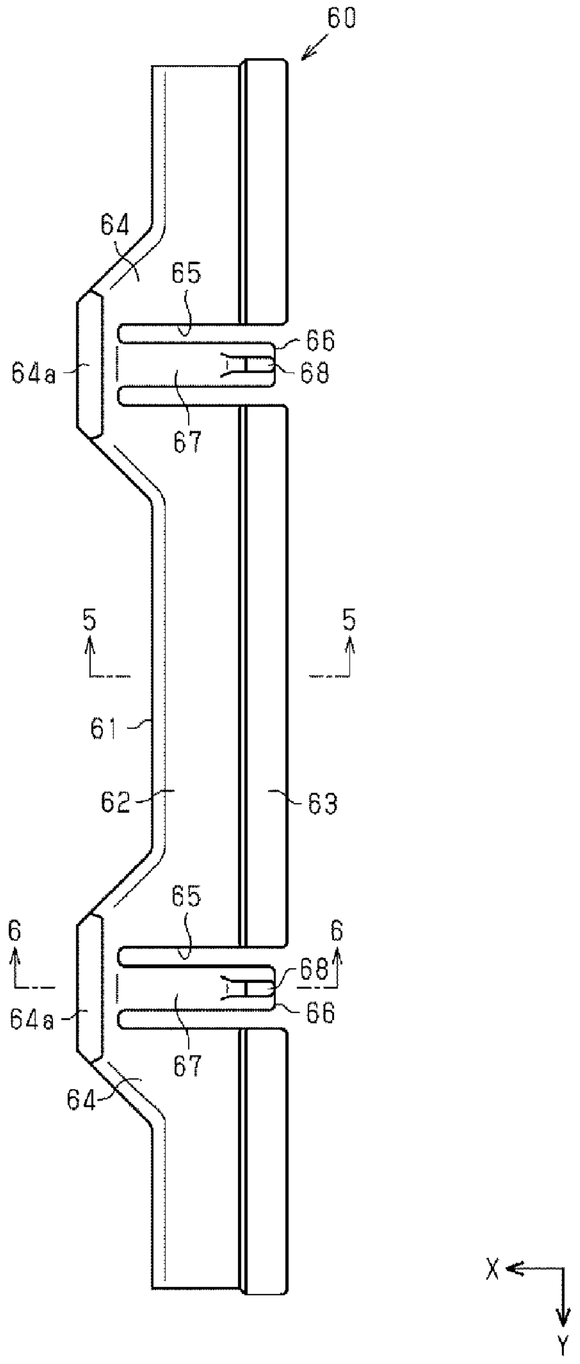
FIG. 4 is a plan view showing the retainer according to the embodiment.

As shown in FIGS. 3 and 4, the main body portion 61 is formed in a flat shape that is longer in the lateral direction Y than in the vertical direction Z, as viewed in the front-rear direction X. The main body portion 61 includes a general portion 62 constituting a tubular portion that covers the outer circumferential surface of the insertion portion 41, a restricting projection 63 protruding from the general portion 62 toward the inner circumferential surface defining the opening 103, and a plurality of protruding portions 64 that protrude from the general portion 62 toward a side opposite to the rubber ring 50 in the axial direction of the main body portion 61. Note that the axial direction of the main body portion 61 in the present embodiment coincides with the front-rear direction X.

Figure 5:
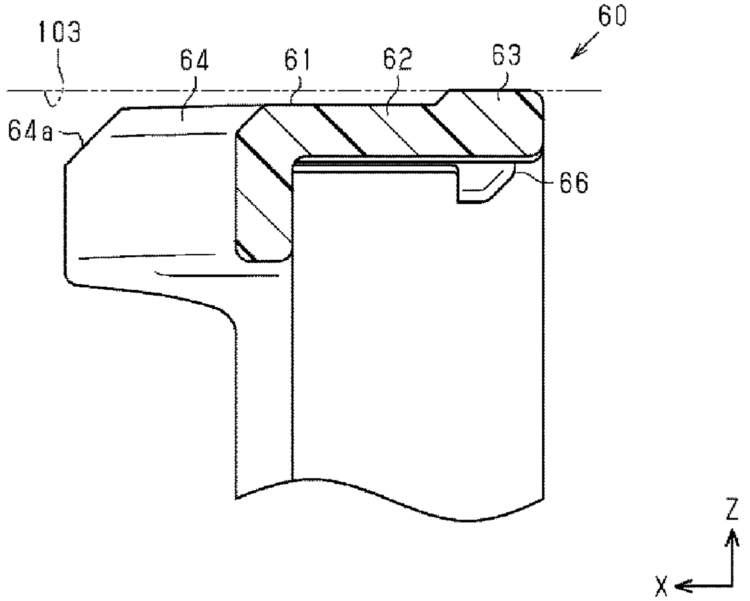
FIG. 5 is a cross-sectional view taken along the line 5-5 in FIG. 4.

As shown in FIGS. 3 and 5, a front end portion of the general portion 62 protrudes circumferentially inward relative to the other portions thereof over the entire main body portion 61 in the circumferential direction.

The restricting projection 63 protrudes from an end portion of the general portion 62 that faces the rubber ring 50 in the front-rear direction X, or in other words a rear end portion of the general portion 62 toward the inner circumferential surface defining the opening 103. The restricting projection 63 extends around the entire general portion 62 in the circumferential direction. The restricting projection 63 is formed in an annular shape that is longer in the lateral direction Y than in the vertical direction Z, as viewed in the front-rear direction X.

The restricting projection 63 is in contact with the entire inner circumferential surface defining opening 103 in the circumferential direction. The restricting projection 63 restricts movement in the front-rear direction X, more specifically, forward movement of the rubber ring 50.

As shown in FIGS. 3 and 4, the protruding portions 64 protrude to the above-described opposite side from an end portion of the general portion 62 that is located on a side opposite to the rubber ring 50 in the front-rear direction X, or in other words, the front end portion of the general portion 62. In the present embodiment, two protruding portions 64 that are located so as to be spaced apart from each other in the lateral direction Y are respectively provided on both sides of the general portion 62 in the vertical direction Z. That is, the main body portion 61 of the present embodiment includes four protruding portions 64.

Figure 6:
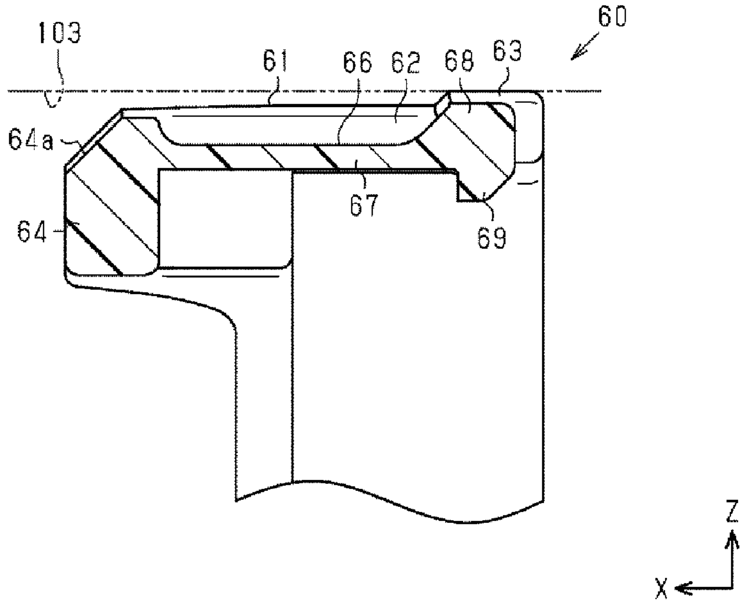
FIG. 6 is a cross-sectional view taken along the line 6-6 in FIG. 4.

As shown in FIG. 6, a protruding end of each of the protruding portions 64 is provided with an inclined surface 64*a* that is inclined so as to be away from the inner circumferential surface defining the opening 103 toward the side opposite to the rubber ring 50 in the front-rear direction X. The inclined surface 64*a* is inclined relative to the front-rear direction X so as to be located circumferentially inward of the main body portion 61 toward the front side.

As shown in FIGS. 3 and 4, the main body portion 61 has a plurality of notches 65 cut out from an end portion of the main body portion 61 that faces the rubber ring 50 in the front-rear direction X, or in other words, a rear end portion of the main body portion 61. The notches 65 are provided so as to correspond to portions of the main body portion 61 where the protruding portions 64 are provided. That is, the main body portion 61 of the present embodiment has four notches 65.

Each of the notches 65 extends from the rear end portion of the main body portion 61 to the corresponding protruding portion 64 in the front-rear direction X. Note that the portions of the main body portion 61 where the notches 65 are provided each have a discontinuous annular shape in the circumferential direction of the main body portion 61.

Configuration of Arm Portions 66

The arm portions 66 are provided at portions corresponding to the notches 65. That is, the retainer 60 of the present embodiment includes four arm portions 66.

A distal end of each of the arm portions 66 is located forward of a rear end face of the restricting projection 63 of the main body portion 61. In other words, the restricting projection 63 is provided at a position closer to the rubber ring 50 than the distal end of the arm portion 66 in the front-rear direction X.

Each of the arm portions 66 includes an extension portion 67 extending from the main body portion 61 toward the rubber ring 50 in the front-rear direction X, a first projection 68 protruding from the extension portion 67 toward the inner circumferential surface defining the opening 103, and a second projection 69 protruding from the extension portion 67 toward the outer circumferential surface of the housing 40.

Each of the extension portions 67 extends in the front-rear direction X inside the corresponding notch 65. A proximal end of the extension portion 67 is located at a portion of the notch 65 that extends to the protruding portion 64. More specifically, the extension portion 67 extends from a front end portion of the notch 65.

As shown in FIG. 6, the thickness of the extension portion 67 is smaller than the thickness of the main body portion 61. The extension portion 67 is located circumferentially inward of the outer circumferential surface of the main body portion 61. The inner circumferential surface of the extension portion 67 and the inner circumferential surface of the main body portion 61 are substantially flush with each other.

As shown in FIGS. 3 and 4, each of the first projections 68 protrudes from a distal end of the corresponding extension portion 67. More specifically, the first projection 68 protrudes from a central portion of the aforementioned distal end in the lateral direction Y. Accordingly, the width of the first projection 68 in the lateral direction Y is smaller than the width of the extension portion 67 in the lateral direction Y.

As shown in FIG. 6, a front end face of the first projection 68 is inclined so as to be located circumferentially inward of the main body portion 61 toward the front. A protruding end of the first projection 68 is provided at a position arranged side by side with the restricting projection 63 in the circumferential direction of the main body portion 61. In addition, the protruding end of the first projection 68 is located circumferentially inward of the outer circumferential surface of the restricting projection 63 in the main body portion 61, and circumferentially outward of the outer circumferential surface of the general portion 62 in the main body portion 61. In other words, the restricting projection 63 protrudes to a position closer to the inner circumferential surface defining the opening 103 than the protruding end of the first projection 68. A slight gap is provided between the protruding end of the first projection 68 and the inner circumferential surface defining the opening 103.

Each of the second projections 69 protrudes from the distal end of the extension portion 67 to a side opposite to the first projection 68. The width of the second projection 69 in the lateral direction Y is the same as the width of the extension portion 67 in the lateral direction Y.

A rear end face of the second projection 69 is inclined so as to be located circumferentially inward of the main body portion 61 toward the front. The second projection 69 is provided at a position arranged side by side with the restricting projection 63 in the circumferential direction of the main body portion 61.

The second projections 69 protrude circumferentially inward of the inner circumferential surface of the main body portion 61. The second projections 69 are configured to be engaged with the recesses 41*a* of the insertion portion 41. As a result of the second projections 69 being engaged with the recesses 41*a*, the retainer 60 is attached to the housing 40.

Figure 7:
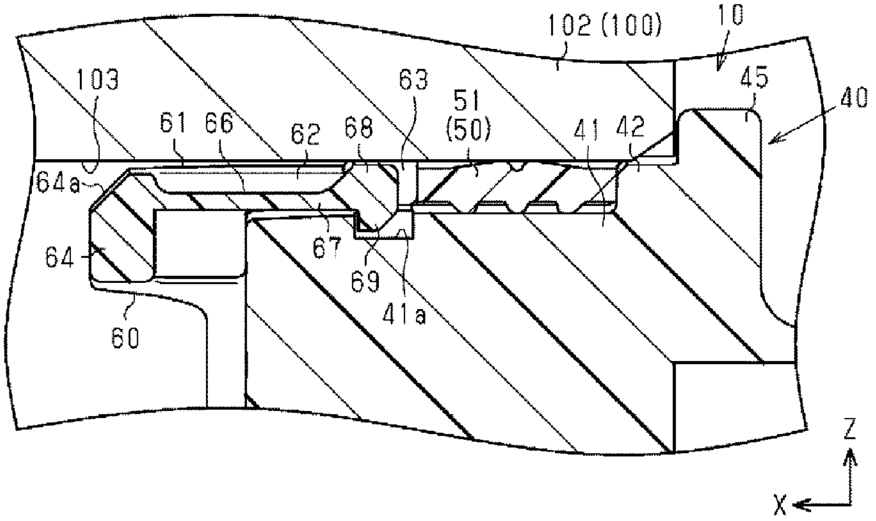
FIG. 7 is an enlarged cross-sectional view showing the fitting device fitted to the case according to the embodiment.

As shown in FIG. 7, the amount of insertion of each of the second projections 69 into the corresponding recess 41*a* is larger than the gap between protruding end of the first projection 68 and the inner circumferential surface defining the opening 103. The term "amount of insertion" as used herein refers to a distance in the vertical direction Z within a range in which the second projection 69 and the recess 41*a* face each other in the front-rear direction X.

The operations of the present embodiment will be described.

According to the present embodiment, the retainer 60 is attached to the housing 40 as a result of the second projections 69 of the arm portions 66 being engaged with the recesses 41*a* of the insertion portion 41. In addition, the amount of insertion of each of the recesses 41*a* into the corresponding second projection 69 is larger than the gap between the corresponding first projection 68 and the inner circumferential surface defining the opening 103. Accordingly, even if the second projection 69 is displaced in a direction away from the recess 41*a* as a result of the arm portion 66 being elastically deformed, the engagement between the second projection 69 and the recess 41*a* can be maintained by the first projection 68 coming into contact with the inner circumferential surface defining the opening 103.

The effects of the present embodiment will be described.

(1) Each of the arm portions 66 includes an extension portion 67 extending from the main body portion 61 toward the rubber ring 50 in the front-rear direction X, a first projection 68 protruding from the extension portion 67 toward the inner circumferential surface defining the opening 103, and a second projection 69 protruding from the extension portion 67 toward the outer circumferential surface of the housing 40 and configured to be engaged with the recess 41*a*. The amount of insertion of the second projection 69 into the recess 41*a* is larger than the gap between the protruding end of the first projection 68 and the inner circumferential surface defining the opening 103.

Such a configuration achieves the above-described operations. Accordingly, for example, even if a load is applied to the arm portion 66 during insertion or removal of the fitting device 10 into or from the case 100, it is possible to suppress the engagement between the second projection 69 and the recess 41*a* from being released. Accordingly, it is possible to suppress detachment of the housing 40 from the retainer 60.

(2) The thickness of each of the extension portions 67 is smaller than the thickness of the main body portion 61.

With such a configuration, the extension portion 67 can be easily elastically deformed with respect to the main body portion 61. This facilitates attachment and removal of the retainer 60 to and from the housing 40.

As a result of the extension portion 67 being easily elastically deformed with respect to the main body portion 61, the engagement between the second projection 69 and the recess 41*a* is likely to be released. However, the engagement between the second projection 69 and the recess 41*a* is maintained by the first projection 68 coming into contact with the inner circumferential surface defining the opening 103. Accordingly, it is possible to suppress detachment of the retainer 60 from the housing 40.

(3) The main body portion 61 has notches 65 extending in the front-rear direction X, and cut out from portions of the main body portion 61 that face the rubber ring 50 in the front-rear direction X. The proximal end of each of the extension portions 67 is located inside the corresponding notch 65.

With such a configuration, the proximal end of the extension portion 67 is located inside the notch 65 extending in the front-rear direction X. Accordingly, it is possible to suppress an increase in the size of the retainer 60, and hence the size of the fitting device 10, as compared with a configuration that does not include the notch 65.

(4) The main body portion 61 includes protruding portions 64 protruding to a side opposite to the rubber ring 50 in the front-rear direction X. Each of the notches 65 extends to the corresponding protruding portion 64. The proximal end of each of the extension portions 67 is located at a portion of the notch 65 that extends to the protruding portion 64.

With such a configuration, the proximal end of the extension portion 67 is located at a portion of the notch 65 that extends to the protruding portion 64. This makes it possible to set the proximal end of the extension portion 67 at a position away from the rubber ring 50. Accordingly, it is possible to prevent an excessive load from acting on the arm portion 66 when the arm portion 66 is elastically deformed.

(5) The protruding end of each of the protruding portions 64 is provided with an inclined surface 64*a* that is inclined so as to be away from the inner circumferential surface defining the opening 103 toward the side opposite to the rubber ring 50 in the front-rear direction X.

With such a configuration, the fitting device 10 can be easily guided to the inside of the opening 103 by the inclined surface 64*a* of the protruding portion 64 when the fitting device 10 is inserted into the opening 103 of the case 100. Accordingly, an operation of fitting the fitting device 10 to the case 100 can be easily performed.

(6) The main body portion 61 includes a restricting projection 63 that protrudes from an end portion thereof facing the rubber ring 50 toward the inner circumferential surface defining the opening 103, and that restricts movement of the rubber ring 50 in the front-rear direction X. The restricting projection 63 is provided at a position closer to the rubber ring 50 than a distal end of the arm portion 66 in the front-rear direction X.

With such a configuration, movement of the rubber ring 50 in the front-rear direction X is restricted by the restricting projection 63. Accordingly, it is possible to suppress the rubber ring 50 from riding on the retainer 60 and being detached from the housing 40.

(7) The protruding end of each of the first projections 68 is provided at a position arranged side by side with the restricting projection 63 in the circumferential direction of the main body portion 61. The restricting projection 63 protrudes to a position closer to the inner circumferential surface defining the opening 103 than the protruding end of the first projection 68.

With such a configuration, when the retainer 60 comes into contact with the inner circumferential surface defining opening 103 by inserting the case 100 of the fitting device 10 into the opening 103, the restricting projection 63 comes into contact with the aforementioned inner circumferential surface, preferentially over the first projection 68. Accordingly, it is possible to prevent an excessive load from acting on the arm portion 66 as a result of the first projection 68 coming into contact with the inner circumferential surface defining the opening 103.

Modifications

The present embodiment can be implemented with the following modifications. The present embodiment and the following modifications can be implemented in combination with each other as long as there are no technical discrepancies.

Figure 8:
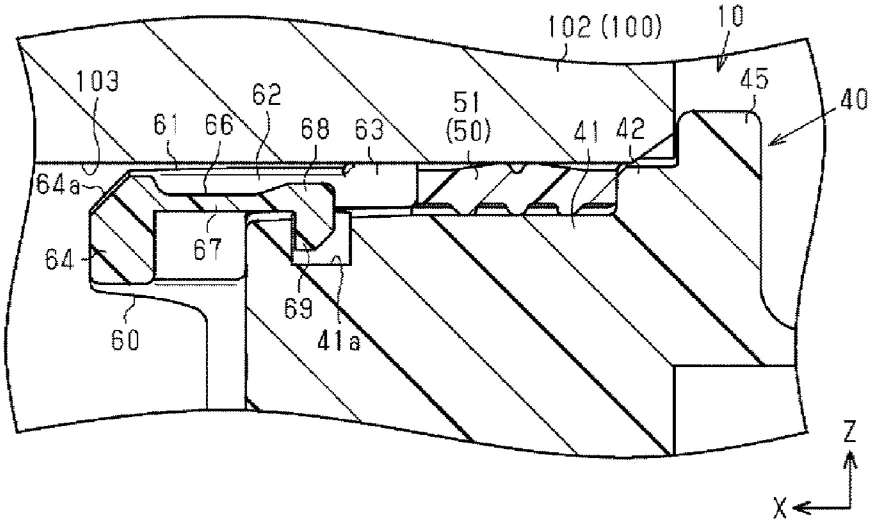
FIG. 8 is an enlarged cross-sectional view showing a fitting device fitted to a case according to a modification.

- As shown in FIG. 8, the protruding end of the first projection 68 may be provided at a position that is arranged side by side with the general portion 62 in the circumferential direction of the main body portion 61, and that is a position of the main body portion 61 located circumferentially inward of the outer circumferential surface of the general portion 62. In other words, the general portion 62 may protrude to a position closer to the inner circumferential surface defining the opening 103 than the protruding end of the first projection 68. In this case, the amount of insertion of the second projection 69 into the recess 41*a* may be increased for the retainer 60 of the present embodiment, thus increasing the amount of insertion to be larger than the gap between the first projection 68 and the inner circumferential surface defining the opening 103. With such a configuration, when the retainer 60 comes into contact with the inner circumferential surface defining the opening 103 by inserting the fitting device 10 into the opening 103 of the case 100, the general portion 62 comes into contact with the aforementioned inner circumferential surface, preferentially over the first projection 68. Accordingly, it is possible to prevent an excessive load from acting on the arm portion 66 as a result of the first projection 68 coming into contact with the inner circumferential surface defining the opening 103.
- In the above modification, the protruding end of the first projection 68 may be flush with the outer circumferential surface of the general portion 62.
- Restricting projections 63 may be provided discontinuously so as to be spaced apart in the circumferential direction at portions of main body portion 61 where the notch 65 is not provided.
- The protruding end of the first projection 68 may be flush with the outer circumferential surface of the restricting projection 63. In this case, the protruding end of the first projection 68 and the inner circumferential surface defining the opening 103 may be in contact with each other. That is, no gap may be produced between the first projection 68 and the inner circumferential surface defining the opening 103.
- The arm portion 66 may extend to a position closer to the rubber ring 50 than the restricting projection 63 in the front-rear direction X. In this case, a restriction portion that restricts movement of the rubber ring 50 in the front-rear direction X by facing the rubber ring 50 may be provided at the distal end of the arm portion 66.
- The restricting projection 63 may be omitted from the main body portion 61.
- The inclined surface 64*a* may be omitted from the protruding portion 64.
- The protruding portion 64 may be omitted from the main body portion 61. In this case, a notch 65 extending to the front end portion of the general portion 62 may be used, and the proximal end of the extension portion 67 may be positioned at a portion of the notch 65 that extends to the front end portion of the general portion 62.
- The notch 65 may be omitted from the main body portion 61. In this case, the extension portion 67 may extend from the general portion 62.
- The thickness of the extension portion 67 may be the same as the thickness of the main body portion 61, or may be larger than the thickness of the main body portion 61.
- At least either the first projection 68 or the second projection 69 may protrude from a portion of the extension portion 67 that is located toward the proximal end side than a portion thereof located at the distal end.
- The numbers and the position of the arm portions 66 can be changed as appropriate.
- Although the conductive path of the present embodiment is formed by the wire 20 and the connection terminal 30, the present disclosure is not limited thereto. The conductive path may be formed, for example, by one or more conductors such as wires, connection terminals, and bus bars, as long as the conductive path is electrically connected to an in-vehicle device.
- The fitting device 10 may have one conductive path, or may have three or more conductive paths.

The housing 40 may be made of, for example, a metal material such as an aluminum alloy.

The housing 40 need not hold the connection terminal 30. That is, the housing 40 may simply cover the outer circumference of the conductive path.

The present disclosure encompasses the following aspects. Reference numerals are assigned to some of the constituent elements of the exemplary embodiments, not for limiting purpose, but for better understanding. Some of the matters described in the following aspects may be omitted, and some of the matters described in the aspects may be selected or extracted for combination.

[Appendix 1] A fitting device (10) according to some aspects of the present disclosure is a fitting device (10) configured to be fitted to an inner circumferential surface (opening 103) of a case (100) for accommodating an in-vehicle device, the fitting device (10) including:

a conductive path (20, 30) that is to be connected to the in-vehicle device;

a fitting body (tube 40) through which the conductive path (20, 30) extends, and that has an outer circumferential surface (insertion portion 41) disposed inside of the inner circumferential surface (103) and one or more recesses (41*a*) open to the outer circumferential surface (41);

a sealing member (50) disposed between the outer circumferential surface (41) and the inner circumferential surface (103); and a retainer (60) that is attached to the outer circumferential surface (41), and that is configured to prevent the sealing member (50) from being dislodged from the fitting body (40), wherein the retainer (60) includes:

one or more elastic arms (arm portions 66) extending toward the sealing member (50);

a first projection (68) protruding from a distal end of each of the elastic arms (66) toward the inner circumferential surface (103); and a second projection (69) protruding from the distal end toward inside of the corresponding recess (41*a*), a length of insertion of the second projection (69) into the recess (41*a*) is larger than a distance between the first projection (68) and the inner circumferential surface (103).

[Appendix 2] In some implementation examples, the one or more recesses (41*a*) may include a plurality of recesses (41*a*) disposed spaced apart in a circumferential direction of the outer circumferential surface (41), and the one or more elastic arms (arm portions 66) may include a plurality of elastic arms (arm portions 66) disposed spaced apart in a circumferential direction of the inner circumferential surface (103).

[Appendix 3] In some implementation examples, the retainer (60) may include a peripheral wall (general portion 62) extending along an outer circumference of the outer circumferential surface (41).

[Appendix 4] In some implementation examples, the inner circumferential surface (103), the outer circumferential surface (41), the sealing member (50), and the peripheral wall (general portion 62) may have shapes similar to each other.

[Appendix 5] In some implementation examples, the inner circumferential surface (103) may have an elongated hole extending through the case (100).

[Appendix 6] In some implementation examples, the retainer (60) may have a pressing portion (restricting projection 63) located at a position closer to the sealing member (50) than the elastic arms (66), and the pressing portion (63) may extend along an edge of the peripheral wall (general portion 62).

[Appendix 7] In some implementation examples, the retainer (60) may have a first edge (63) extending along the sealing member (50), and a second edge opposite the first edge (63).

[Appendix 8] In some implementation examples, the second edge may include one or more protruding portions (64) protruding from the peripheral wall (general portion 62) in a direction opposite to the elastic arms (66), and each of the protruding portions (64) may have a trapezoidal shape surrounding a proximal end of each of the elastic arms (66).

[Appendix 9] In some implementation examples, a width of the second projection (69) may be equal to a width of the elastic arm (66).

[Appendix 10] In some implementation examples, a width of the first projection (68) may be smaller than a width of the elastic arm (66).

LIST OF REFERENCE NUMERALS

10 Fitting device
20 Wire
21 Core wire
22 Insulation covering
30 Connection terminal
31 Wire connection portion
32 Terminal connection portion
32*a* Through hole
40 Housing
41 Insertion portion
41*a* Recess
42 Protruding portion
42*a* Groove
43 Holding hole
44 Placement portion
45 Flange portion
45*a* Through hole
46 Insertion hole
47 Engaging hole
50 Rubber ring
51 Main body portion
52 Positioning protrusion
60 Retainer
61 Main body portion
62 General portion
63 Restricting projection
64 Protruding portion
64*a* Inclined surface
65 Notch
66 Arm portion
67 Extension portion
68 First projection
69 Second projection
70 Rubber stopper
80 Back retainer
80*a* Through hole
81 Fixing pawl
100 Case
101 Main body portion
102 Mounting portion
102*a* Internal thread
103 Opening

What is claimed is:

1. A fitting device configured to be fitted to an opening provided in a case for accommodating an in-vehicle device, the fitting device comprising:

a conductive path that is to be connected to the in-vehicle device;

a tube including an insertion portion that is inserted into the opening, and that covers an outer circumference of the conductive path;

a sealing member that is attached to an outer circumferential surface of the insertion portion, and that waterproofs a space between the tube and the case; and a retainer that is attached to the insertion portion, and that prevents the sealing member from being dislodged from the tube, wherein the tube has a recess provided in the outer circumferential surface of the insertion portion, the retainer includes a tubular main body portion that covers the outer circumferential surface of the insertion portion, and an arm portion extending from the main body portion and configured to be elastically deformable, the arm portion includes an extension portion extending from the main body portion toward the sealing member in an axial direction of the main body portion, a first projection protruding from the extension portion toward an inner circumferential surface defining the opening, and a second projection protruding from the extension portion toward an outer circumferential surface of the tube and configured to be engaged with the recess, and an amount of insertion of the second projection into the recess is larger than a gap between the first projection and the inner circumferential surface defining the opening.

2. The fitting device according to claim 1, wherein a thickness of the extension portion is smaller than a thickness of the main body portion.

3. The fitting device according to claim 1, wherein the main body portion has a notch extending in the axial direction, and cut out from an end portion of the main body portion that faces the sealing member in the axial direction, and a proximal end of the extension portion is located inside the notch.

4. The fitting device according to claim 3, wherein the main body portion includes a protruding portion protruding toward a side opposite to the sealing member in the axial direction, the notch extends to the protruding portion, and the proximal end of the extension portion is located at a portion of the notch that extends to the protruding portion.

5. The fitting device according to claim 4, wherein a protruding end of the protruding portion is provided with an inclined surface that is inclined so as to be away from the inner circumferential surface defining the opening toward the side opposite to the sealing member in the axial direction.

6. The fitting device according to claim 3, wherein the main body portion includes a restricting projection that protrudes from an end portion thereof facing the sealing member in the axial direction toward the inner circumferential surface defining the opening, and that restricts movement of the sealing member in the axial direction, and the restricting projection is provided at a position closer to the sealing member than a distal end of the arm portion in the axial direction.

7. The fitting device according to claim 6, wherein a protruding end of the first projection is provided at a position arranged side by side with the restricting projection in a circumferential direction of the main body portion, and the restricting projection protrudes to a position closer to the inner circumferential surface defining the opening than the protruding end of the first projection.

8. The fitting device according to claim 1, wherein the main body portion includes:

a general portion constituting a tubular portion that covers an outer circumferential surface of the insertion portion; and a restricting projection that protrudes from an end portion of the general portion that faces the sealing member in the axial direction toward the inner circumferential surface defining the opening, and that restricts movement of the sealing member in the axial direction, and a protruding end of the first projection is provided at a position arranged side by side with the general portion in the circumferential direction of the main body portion, and the general portion protrudes to a position closer to the inner circumferential surface defining the opening than the protruding end of the first projection.

* * * * *